Sept. 15, 1970          E. W. MARLEY          3,528,199

AUTOMATIC IN-FEED ATTACHMENT FOR CENTERLESS GRINDERS

Filed May 1, 1968

INVENTOR.
EDWARD W. MARLEY
BY
ATTORNEYS

United States Patent Office 3,528,199
Patented Sept. 15, 1970

3,528,199
AUTOMATIC IN-FEED ATTACHMENT FOR CENTERLESS GRINDERS
Edward W. Marley, Dearborn, Mich., assignor to Ferro Equipment Co., Detroit, Mich., a corporation of Michigan
Filed May 1, 1968, Ser. No. 725,859
Int. Cl. B24b 5/18
U.S. Cl. 51—103      6 Claims

ABSTRACT OF THE DISCLOSURE

A centerless grinding machine having a grinding wheel and a regulating wheel and an in-feed attachment for moving the regulating wheel toward and away from the grinding wheel. The in-feed attachment comprises a first cam which moves with the regulating wheel, a second cam which is fixed with respect to the grinding wheel, the two cams having confronting cam surfaces, one being inclined with respect to the other and a wedge member supported between the cams. Motion of the wedge in a feed direction moves the movable cam and the regulating wheel away from the fixed cam and toward the grinding wheel. Motion of the wedge in its return direction allows the regulating wheel to separate from the grinding wheel under the influence of a spring bias at the termination of the grinding cycle.

BACKGROUND OF THE INVENTION

This invention relates to centerless grinding machines, and more particularly to a novel in-feed mechanism for moving the regulating wheel toward and away from the grinding wheel during a grinding cycle.

Centerless grinding machines are frequently employed in production operations for finishing the cylindrical surface of a workpiece that is supported between a grinding wheel and a regulating wheel on a workpiece support. The two wheels are conventionally mounted on a frame with the regulating wheel being supported for motion toward and away from the grinding wheel between a first position in which the regulating wheel is spaced from the grinding wheel to allow a rough workpiece to be inserted in the throat defined by the two wheels, and a second position toward which the regulating wheel is advanced during the grinding operation. This latter position determines the final dimensions of the finished workpiece. At the end of the grinding stroke, the regulating wheel is returned toward its first position so that the finished workpiece can be removed from between the wheels and a rough workpiece inserted for the next grinding cycle.

Conventionally, the regulating wheel is mounted on a slide which travels on a bed with a feed screw and hand wheel mechanism allowing the operator to move the regulating wheel toward and away from the grinding wheel. In a production cycle, it is extremely difficult for the operator to repetitively advance the regulating wheel toward a precise position with respect to the grinding wheel. The present invention provides an in-feed attachment that readily lends itself to an automatic feed cycle and provides a precise control over the motion of the regulating wheel to consistently finish a series of workpieces.

SUMMARY

The preferred embodiment of the present invention, which will subsequently be described in greater detail, is an attachment for a conventional, centerless grinding machine in which the grinding wheel is mounted on a frame having a bed. A regulating wheel is mounted on a head which is slidably supported on the bed for motion toward and away from the grinding wheel. The head is connected with a feed screw which is fixed against rotation so that a hand wheel mounted on the head and interconnected with the feed screw allows the operator to move the regulating wheel toward or away from the grinding wheel. This rough feed means provides means for initially positioning the regulating wheel in a rough feed position with respect to the grinding wheel.

A fine feed means provides means for advancing the regulating wheel from its rough feed position toward the grinding wheel and comprises a first cam member secured to the end of the feed screw so that it moves with the regulating wheel with respect to the bed. The fine feed means also includes a second cam member that is fixedly mounted with respect to the first cam member and has a cam surface confronting a cam surface on the first cam member, the two cam surfaces being inclined with respect to one another at a predetermined angle.

A wedge member is disposed between the two cam members with surfaces engaged with the surfaces of the cam members so that motion of the wedge member in a direction at right angles to the travel of the regulating wheel moves the cam and the regulating wheel. When the wedge member is advanced in a feed direction, it moves regulating wheel from its rough feed position toward the grinding wheel. The distance traveled by the wedge member is controlled by an adjustable stop member which thereby controls the travel of the regulating wheel toward the grinding wheel. The stop means allows the operator to adjust the travel of the wedge member in order to compensate for wear of the abrasive surfaces of the grinding wheel and the regulating wheel.

The motion of the wedge member is controlled by a hydraulic actuator and a programmed hydraulic circuit. The hydraulic actuator preferably comprises a hydraulic cylinder having its rod connected to the wedge member so that when the hydraulic circuit extends the rod from the cylinder, the wedge member advances in its feed direction and retraction of the rod causes the wedge member to move in its reverse direction.

The hydraulic control circuit is programmed so that the wedge member initially advances in a rapid feed until the workpiece is engaged with the surfaces of the regulating wheel and the grinding wheel, then a fine feed in which the regulating wheel moves at a controlled rate toward the grinding wheel as the two wheels finish the surface of the workpiece, then a time delay while the surface of the workpiece is being finished and which generally corresponds to when the sparks normally generated from the grinding operation terminate, and then a return motion which separates the regulating wheel from the grinding wheel.

The preferred in-feed mechanism provides a number of advantages over conventional feed mechanisms. It enables the grinding machine to produce a consistent finish on a series of workpieces that are consecutively fed into the machine. The preferred mechanism readily lends itself to an automatic feed cycle in which the operator by pushing a control button triggers the hydraulic circuitry to move the wedge member in the grinding cycle. Still another very significant advantage of the mechanism is the high mechanical advantage developed between the motion of the actuating cyclinder and the motion of the regulating wheel head. For instance, in a combination hydraulic-pneumatic circuit in which the in-put energy is in the form of compressed air at a pressure of about 80 p.s.i., the wedge developed a thrust on the regulating wheel head of 1050 lbs. In addition, by providing sliding surfaces between the wedge and the two cams, the force developed by the wedge member as it is advanced in its feed direction, is uniformly distributed over a large surface area in a relatively simple mechanism.

Still other objects and advantages of the present invention will readily occur to one skilled in the art to

DESCRIPTION OF THE DRAWINGS

The description refers to the accompanying drawing in which like reference characters refer to like parts throughout the several views in which.

DESCRIPTION OF THE PREFERRED EMBODIMENT

Figure 1:
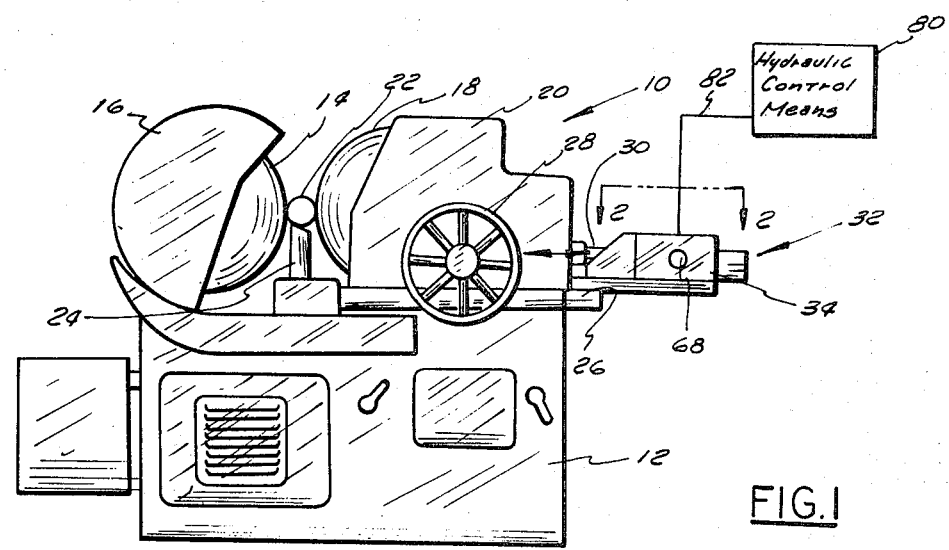
FIG. 1 is an elevational view of a centerless grinding machine having an in-feed attachment in accordance with the principles of my invention.
Figure 2:
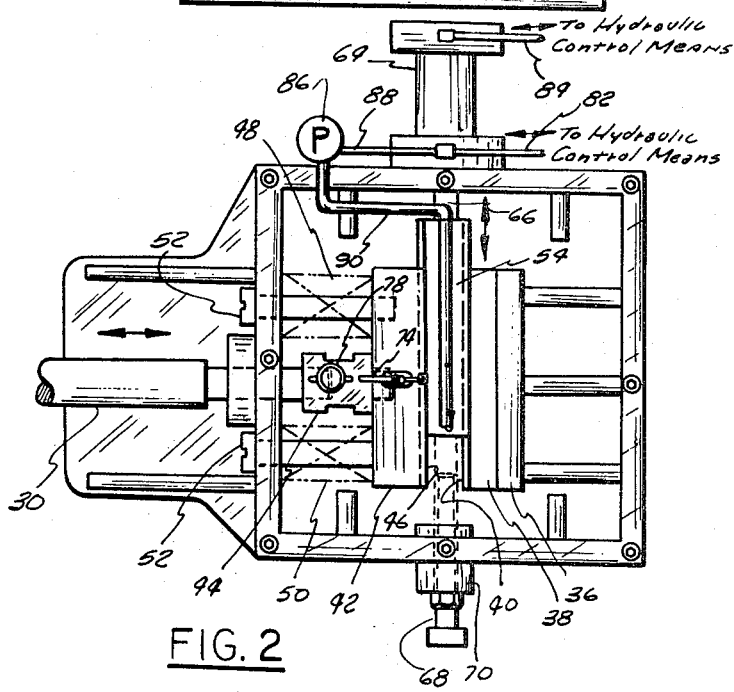
FIG. 2 is an enlarged plan view of the in-feed attachment as seen along lines 2—2 of FIG. 1.
Figure 4:
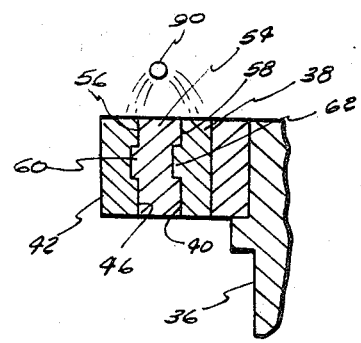
FIG. 4 is a transverse sectional view taken through the two cam members and the wedge member to show the tongue and groove means connecting their sliding surfaces.
Figure 3:
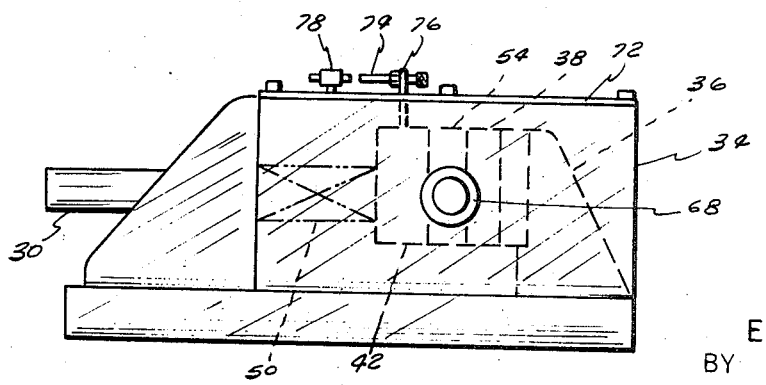
FIG. 3 is an enlarged elevational view of the in-feed attachment of FIG. 1.

Referring to FIGS. 1 to 4 the preferred centerless grinder is illustrated in FIG. 1 at 10 and comprises a frame 12. A conventional grinding wheel 14 having an abrasive surface is mounted on the frame 12 for rotating by a power driving means (not shown). The wheel 14 is relatively fixed with respect to the frame and disposed within a suitable housing 16. A regulating wheel 18 is rotatably mounted on a head 20 which has a conventional power driving mechanism (not shown) for rotating the regulating wheel.

A surface finishing operation is normally performed on a workpiece 22 having a cylindrical surface by mounting the workpiece on a support 24 between the grinding wheel 14 and regulating wheel 18. The support 24 and the regulating wheel 18 are in some cases moved jointly toward the grinding wheel, and in other cases only the regulating wheel is moved toward the grinding wheel to effect grinding of the workpiece. This normally depends on the size of the work.

In order to move the regulating wheel 18 with respect to the grinding wheel 14, the head 20 is slidably mounted on a bed 26 on the frame 12 and a hand wheel 28, mounted on the head, is interconnected with a threaded feed screw 30. The outer end of the feed screw 30 is restrained against rotation. Rotation of the hand wheel 28 in one direction moves the head and the regulating wheel with respect to the feed screw toward the grinding wheel, and rotation of the hand wheel in the opposite direction moves the head and regulating wheel away from the grinding wheel. Thus it can be seen that the hand wheel 28 and the feed screw 30 provide a rough feed means for positioning the regulating wheel in an initial feed position.

A fine feed means, generally indicated at 32, provides means for advancing the regulating wheel 18 from its initial feed position toward the grinding wheel 14, during the grinding cycle. The fine feed means includes a fluid-tight support housing 34 mounted on the end of the frame 12. A bracket 36 is internally mounted in the housing and supports a first cam member 38 which has a cam surface 40 facing toward the grinding wheel 14. The cam member 38 is relatively fixed with respect to the grinding wheel with its cam face formed in a plane perpendicular to the direction of motion of the regulating wheel 18 toward and away from the grinding wheel 14.

A second cam member 42 is secured by a fastener 44 to the end of the feed screw 30 so that the cam member 42 moves with the feed screw 30, the head 20 and the regulating wheel 18 with respect to the grinding wheel. The cam member 42 has cam surface 46 facing and inclined with respect to the cam surface 40 of the first cam member 38. A pair of spring means 48 and 50 are disposed between the front wall of the housing 34 and behind the cam member 42 and bias the cam member 42 toward the cam member 38. The spring means 48 and 50 are wrapped around a pair of guide screws 52 having their inner ends attached to the cam member 42. The guide screws 52 are slidably mounted on a forward wall of the support means with their heads acting as stop means to limit the rearward motion of the feed screw 30 toward the cam member 38.

A wedge member 54 is mounted between the cam members 38 and 42 and has a pair of wedge surfaces 56 and 58 slidingly engaged with the cam surfaces 46 and 40. The wedge surface 56 is inclined with respect to the wedge surface 58 at the same angle of inclination of the two facing cam surfaces 40 and 46. The wedge surfaces of the wedge member 54 engaged with the cam surfaces of the cams 38 and 42 are inter-connected by tongue and groove means 60 and 62 which guide the wedge member for motion in a feed direction in whch it moves the cam member 42 away from the cam member 38 thereby advancing the feed screw 30, the head 20 and the regulating wheel toward the grinding wheel. Similarly, motion of the wedge member in its reverse direction, allows the cam member 42 to move toward the cam member 38 under the influence of the spring means 48 and 50 so that the feed screw 30, the head 20, and the regulating wheel 18 move away from the grinding wheel 14.

Preferably the cam members 38 and 42 and the wedge member are formed of a hardened and ground tool steel. The taper between the cam surfaces of the two cam members is such as to produce .060" travel of the feed screw by the motion of the wedge member in a 3" stroke. Thus the feed mechanism provides a very high mechanical advantage with the forces transmitted between the two cam members being distributed uniformly over the large surface area of the sliding surfaces between the wedge member and the cam members.

A hydraulic cylinder 64, mounted on the housing 34, has a projectable rod 66 connected to the wedge member 54 and provides actuator means for advancing the wedge member in its feed and return directions. The rod 66 has a variable stroke and moves in a direction generally transverse to the motion of the feed screw 30. A threaded stop member 68 mounted on the sidewall of the support housing 34 has an inner end which abuts the wedge member 54 so as to limit its motion in its feed direction. Thus the position in which the wedge member 54 abuts the end of the stop member 68 determines the position which the motion of the regulating wheel 18 toward the grinding wheel 14 is terminated and defines the final dimensions of the workpiece 22. By adjusting the stop member 68, which is locked in place by a collar 70, the travel of the regulating wheel 18 and its grinding stroke can be controlled to approximately .0001". The stop member 68 provides means for varying the stroke of the wedge member 54 in order to compensate for wear of the abrasive surfaces of the regulating wheel 18 and the grinding wheel 14.

The support housing 34 has a plastic top 72 which allows the internal components to the housing to be viewed. A stop member 74 carried by a bracket 76 attached to the cam member 42 which extends through the top 72 engages an indicator means 78 mounted on the top which indicates to the operator the travel of the feed screw 30 and thereby the travel of the regulating wheel 18 and enables him to adjust the position of the stop member 68 accordingly.

The hydraulic cylinder 64 is connected to a hydraulic control means 80 which preferably comprises a series of components programmed to initially extend the rod 66 from its fully retracted position in a rapid feed motion which brings the regulating wheel 18 into engagement with the workpiece 22, then a fine feed motion during which the surface finishing of the workpiece 22 occurs and which terminates with a time delay to allow the grinding wheel 14 and regulating wheel 18 to complete the surface finishing operation, and finally in a return stroke in which the wedge member 54 is returned to its retracted position. Programmed control means of this nature are well known and can be performed by a variety of arrangements well known to those skilled in the hydraulic arts.

The connection between the control means 80 and the cylinder 64 includes a hydraulic circuit 82 and a hydraulic circuit 84 which alternately supply and return oil under pressure to the opposite ends of the cylinder 64 so as to extend and retract the rod 66. The circuit 82 is connected to a hydraulic pump 86 through a line 88 which bleeds oil to the pump which in turn pressurizes the oil and delivers it to a perforated line 90 into the support housing 34 and above the wedge member 54. The oil is sprayed down from the line 90 onto the upper surface of wedge member 54, and the cam members 38 and 42 where it flows over the surfaces of the wedge member engaged with the surfaces of the cam members and provides a lubrication means. The oil then flows to the bottom of the support housing and is returned to the pump by a return line (not shown).

This lubrication further assists the feed means 32 in developing a very high mechanical advantage which is developed in a system having relatively few components which can be eesily attached to conventional centerless grinding machines, as well as incorporated in a design of the newer machines. The feed means 32 provides a secondary feed means for the grinding apparatus and enables the grinding machine to finish a series of workpieces in a production operation with consistent dimensions and surface finish.

Although I have described but one embodiment of my invention, it is to be understood that various changes and revisions can be made therein without departing from the spirit of the invention as expressed in the scope of the appended claims.

I claim:
1. In a grinding machine:
   (a) a frame,
   (b) a grinding wheel supported for rotation on the frame and relatively fixed with respect to the frame,
   (c) a first cam member relatively fixed with respect to the grinding wheel and spaced from the grinding wheel, said first cam member having a cam surface facing toward the grinding wheel,
   (d) a regulating wheel supported for rotation about an axis generally parallel to the axis of rotation of the grinding wheel, and mounted on the frame between the grinding wheel and the first cam member for motion in a first direction in which it moves toward the grinding wheel and away from the first cam member, and a second, opposite direction in which it moves toward the first cam member and away from the grinding wheel;
   (e) a second cam member connected with the regulating wheel and disposed between the regulating wheel and the first cam member, said second cam member being movable with the regulating wheel and having a cam surface facing and inclined with respect to the cam surface of the first cam member;
   (f) means on the frame for supporting a workpiece having a cylindrical surface between the regulating wheel and the grinding wheel for the performance of a surface finishing operation on the workpiece as the regulating wheel is moved in its first direction toward the grinding wheel;
   (g) a wedge member supported between the first and second cam members for motion in a direction generally transverse to the motion of the regulating wheel with respect to the grinding wheel, said wedge member having first and second wedge surfaces slidingly engaged with the cam surfaces of the first and second cam members, respectively, so that motion of the wedge member between the cam members in a feed direction moves the second cam member away from the first cam member and the regulating wheel toward the grinding wheel; and
   (h) actuator means connected to the wedge member to move the wedge member in its feed direction.

2. The combination as defined in claim 1, including means normally biasing the second cam member toward the first cam member so that the regulating wheel is moved away from the grinding wheel as the wedge member is moved in a reverse direction between said first and second cam members.

3. The combination as defined in claim 2, including tongue and groove means disposed between the surfaces of the wedge member engaged with the surfaces of the first and second cam members, for guiding the motion of the wedge member as it is moved by the actuator means in its feed and reverse directions.

4. The combination as defined in claim 1, including adjustable stop means engageable with the wedge member for terminating the motion of the wedge member in its feed direction in a selected position to thereby terminate the motion of the regulating wheel toward the grinding wheel in a selected position with respect to the grinding wheel.

5. The combination as defined in claim 1, including rough feed means for initially positioning the regulating wheel with respect to the grinding wheel in a rough feed position so that motion of the wedge member between the first and second cam members advances the regulating wheel toward the grinding wheel from the rough feed position to a fine feed position.

6. The combination as defined in claim 5, wherein said actuator means comprises a hydraulic cylinder fixed with respect to the first cam member and having a projectable rod connected to the wedge member, a hydraulic circuit connected with said cylinder to extend the rod to advance the wedge member in its feed direction and to retract the rod to move the wedge member in its reverse direction, and means for bleeding oil from the hydraulic circuit and introducing the bled oil into lubricating engagement with the surfaces of the wedge member engaged with the cam surfaces of the first and second cam members.

References Cited
UNITED STATES PATENTS

| 1,919,143 | 7/1933 | Binns | 51—103 |
| 2,927,408 | 3/1960 | Cann | 51—103 |

LESTER M. SWINGLE, Primary Examiner

U.S. Cl. X.R.

51—165